Jan. 21, 1930.                G. B. MULLEN                1,744,491
                          VALVE FOR FLUSH TANKS
                           Filed Feb. 18, 1929
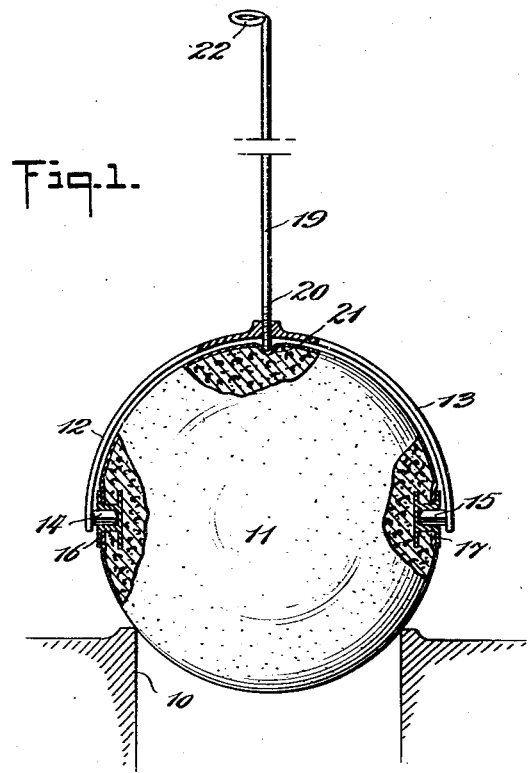
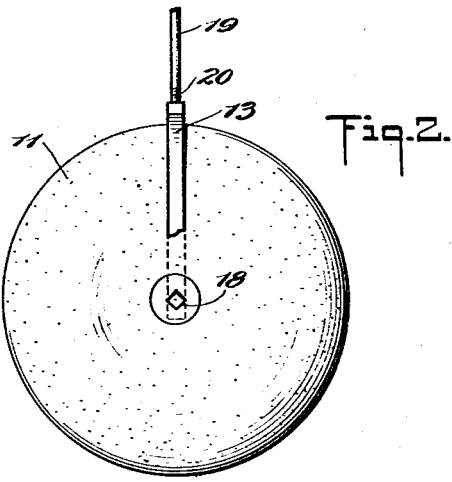
INVENTOR
GEORGE B. MULLEN Patented Jan. 21, 1930

1,744,491

UNITED STATES PATENT OFFICE

GEORGE B. MULLEN, OF BAYSIDE, NEW YORK

VALVE FOR FLUSH TANKS

Application filed February 18, 1929. Serial No. 340,777.

This invention relates to an improvement in valves and has particular reference to valves employed in flush tanks for toilets.

The object of the invention is to provide a simple, efficient, economically manufactured valve which will function correctly over a longer period of time and is capable of being adjusted to new positions so that its life as a properly seating valve can be extended indefinitely.

Further and more specific objects, features, and advantages will more clearly appear from the detailed description given below taken in connection with the accompanying drawings which form part of the specification, which illustrate one embodiment of the invention, and in which, Fig. 1 is a side elevation, with portions broken away, of the preferred form of the valve, and, Fig. 2 is a similar view taken at right angles to Fig. 1.

Most of the present types of flush tank valves are either of metal or of hollow rubber and so mounted that when the material of which they are made commences to wear and not to seat properly, they have to be taken out and new ones substituted. This of course is a nuisance and is unnecessarily expensive. In accordance with my improvement, I employ a ball or rubber which is substantially solid, that is, it is either of what is known as sponge rubber or of porous rubber, either of which substances will give the valve that natural resilience which is highly desirable while at the same time it is of sufficient solidity to properly seat itself and amenable to pressure exerted against it.

As shown in the drawings, the valve is normally designed to close the upper end of an outlet pipe 10 in a toilet flush tank, and is in the form of a rubber ball 11 of either sponge or porous rubber provided on its exterior surface with a substantially impervious coating of fabric such as the fleecy cotton coverings now used on tennis balls. The natural and unusual springiness of the sponge rubber and its substantial altho not actual solidity gives it an ability to maintain a firm seat even under the slightest pressure against its seat and the fleecy coating maintains the seat tight against the leakage of fluid around the valve. Also this coating seems not to collect the slime and the scum with which most ordinary valves become ultimately coated to the complete destruction of their functions as valves.

Because of its nature my valve is a decided improvement over those now in use but an additional advantage is derived from the manner in which it is mounted on its supporting member. This member comprises a yoke shaped element having two arms 12 and 13 passing around the ball 11 and provided on their outer ends with inwardly projecting studs 14 and 15 projecting into metal socket members 16 and 17 which are inserted in the surface of the ball in any suitable and desired manner such as by moulding. The shape of the sockets is preferably square as designated by the numeral 18 and the studs 14 and 15 are correspondingly shaped so that when once the studs are in position in the sockets the ball can not turn.

A rod 19 is threadably connected to the upper central portion of the yoke element as at 20 and its lower end 21 projects slightly into the body of the ball 11 to further insure the steadiness of the valve. As thus mounted, it will be seen that the lower portion of the ball acts as a valve to bear against the adjacent face of the outlet pipe 10 to effectively seal it when desired. As this valve face slowly wears and leakage occurs, it is merely necessary to remove the studs 14 and 15 from the sockets 16 and 17, whereupon the ball may be turned around to present the opposite face as the valve surface and to reengage the studs again in the sockets. Thus the ball may be effectively employed for much longer than usual and the material of the valve is such as to naturally resist wear better than ordinary valves used for this purpose.

The rod 19 has at its upper end the usual connection 22 whereby it may be connected to the usual lever system in the ordinary toilet tank. The engagement of the studs and the sockets may be such that more than two positions of adjustment may be adopted by the ball. Also the particular form of the supporting member is not important since the rod 19 may be connected directly to the ball in such manner that it may engage in one or more sockets itself as desired.

While I have described my improvement in detail and with respect to a preferred form thereof, I do not desire to be limited to such details or form since many changes and modifications may be made and the invention embodied in other forms without departing from the spirit and scope of the invention in its broader aspects. Hence I desire to cover all modifications and forms coming within the language or scope of any one or more of the appended claims.

What I claim as new and desire to secure by Letters Patent, is:

1. A valve comprising a ball of spongy porous rubber and a substantially impervious fleecy coating therefor.

2. A valve comprising a ball of spongy porous rubber and a substantially impervious fabric coating therefor.

3. A flush tank valve device which comprises a ball valve having sockets in its opposite sides, a yoke shaped supporting member having arms extending into said sockets, the shape of the arms and the sockets in cross section permitting the adjustment of the valve in several positions around the axis between the arms when disengaged therefrom, but holding the ball in the adjusted position when the arms and the sockets are engaged.

4. A flush tank valve device comprising a ball valve having sockets in its sides opposite each other, a yoke member having flexible arms with ends to be sprung into said sockets, and an element on the yoke member projecting therefrom into the surface of the ball between the sockets to aid in holding the ball in position.

5. A flush tank valve device comprising a ball valve having oppositely disposed sockets in its sides with polygonal sided cross section, a yoke member having flexible arms with ends to be sprung into said sockets, and with similar cross sectional shapes, said cross sectional configurations permitting the ball to be held in an adjusted position when engaged by the arms but permitting the ball to be moved to a new position when disengaged from the arms.

GEORGE B. MULLEN.